July 12, 1966  E. A. HORTON  3,260,391
TRUCK WITH POWER MEANS FOR MOVING VACUUM GRIPPING DEVICE
Filed May 24, 1962  3 Sheets-Sheet 1

INVENTOR.
EARL A. HORTON
BY
ATTORNEY

July 12, 1966  E. A. HORTON  3,260,391
TRUCK WITH POWER MEANS FOR MOVING VACUUM GRIPPING DEVICE
Filed May 24, 1962  3 Sheets-Sheet 2

INVENTOR.
EARL A. HORTON
BY
ATTORNEY

July 12, 1966 E. A. HORTON 3,260,391
TRUCK WITH POWER MEANS FOR MOVING VACUUM GRIPPING DEVICE
Filed May 24, 1962 3 Sheets-Sheet 3
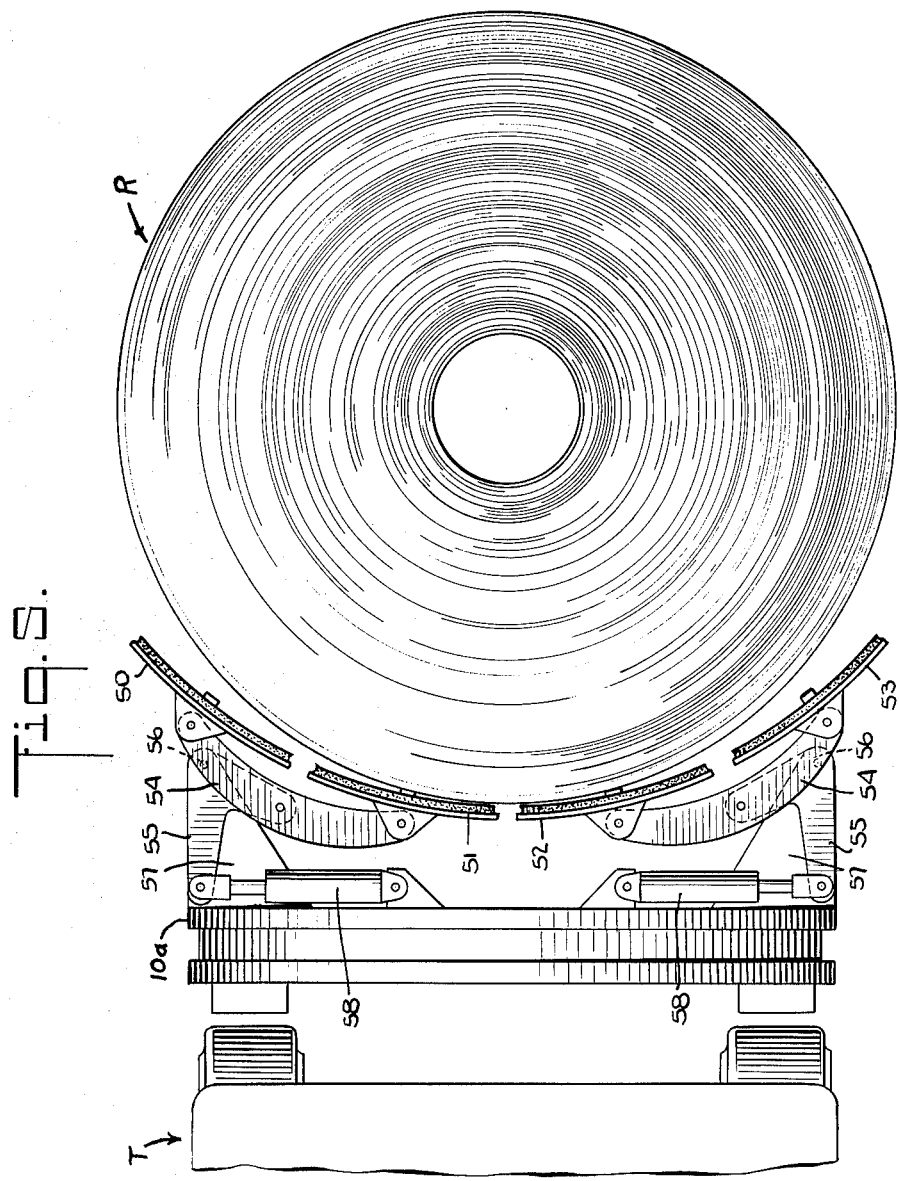
INVENTOR.
EARL A. HORTON
BY
ATTORNEY

3,260,391
TRUCK WITH POWER MEANS FOR MOVING VACUUM GRIPPING DEVICE

Earl A. Horton, Philadelphia, Pa., assignor, by mesne assignments, to Eaton Yale & Towne, Inc., a company of Ohio
Filed May 24, 1962, Ser. No. 197,432
6 Claims. (Cl. 214—650)

This invention relates to a novel load gripping vacuum device for industrial lift trucks.

When a lift truck is equipped with one or more members that utilize vacuum for gripping a load, each member should be able to make vacuum sealing contact with the surface of the load, as will be appreciated. Frequently, each vacuum utilizing member is mounted for yielding or articulating movement, so that it can adjust its position more readily to effect a seal when moving into contact with the load, especially when handling loads that have irregular or varying shapes. That construction generally operates quite well, but in some instances I have found that there still is difficulty in establishing a vacuum seal between the load engaging members and the load surface. That may make the handling of the load dangerous or impossible, and in any event causes a loss of efficiency in the operation of the truck.

Through the novel concept of my invention, I can establish much more effectively a sealing contact between a load gripping vacuum member and loads that may vary in shape. I have particularly conceived a vacuum device that will be actuated to change its shape, so as to match the contour of a load. It is then a relatively simple matter to achieve efficient vacuum gripping of the load.

The novel concept of my invention will be used to particular advantage on trucks that handle cylindrical loads, such as rolls of paper, that may vary in diameter. My vacuum device may for example comprise a flexible plate, with power means whereby the plate will assume different curvilinear shapes. Thus, I can make the vacuum device conform to the surface of a particular roll or load that is to be gripped, so that it may very readily establish sealing contact with the load surface.

A further part of my invention resides in certain automatic features of my novel load gripping vacuum device. Thus, I equip my device with sensing means that will sense the contour of a load that is to be engaged. The sensing means will act through the power means that control the shape of the vacuum device, automatically causing that shape to match the load surface. I prefer to utilize the sensing means also to prevent an unnecessary loss of vacuum through the vacuum device. Thus, I may arrange the sensing means to allow an application of the vacuum only when the vacuum device has been actuated to the proper shape and is substantially in contact with the load.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily by utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

In the drawings:

FIG. 5 shows a further form of my invention.

Figure 1:
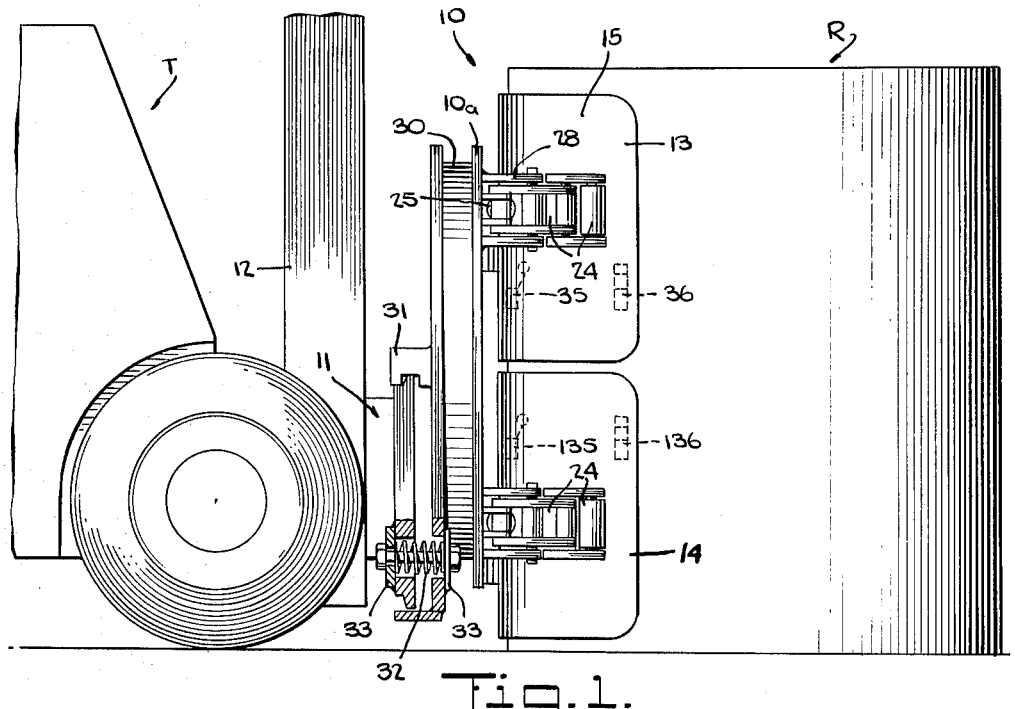
FIG. 1 shows a side view of my novel load gripping vacuum device mounted on an industrial truck.

Referring now more particularly to FIG. 1 of the drawings, I show my novel load gripping vacuum device 10 supported on the lifting carriage 11 of an industrial truck T, with the device in position for engaging a roll of paper R. The details of the truck T are not important to an understanding of my invention, and it is merely necessary to know that the carriage 11 may move vertically, as on uprights 12 on the truck.

Figure 2:
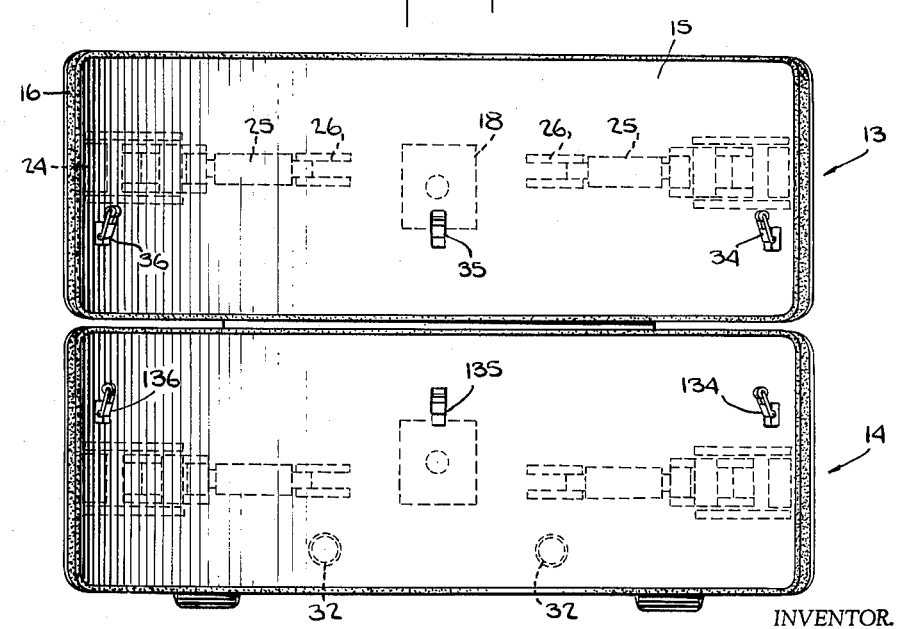
FIG. 2 shows a front view of my device.
Figure 3:
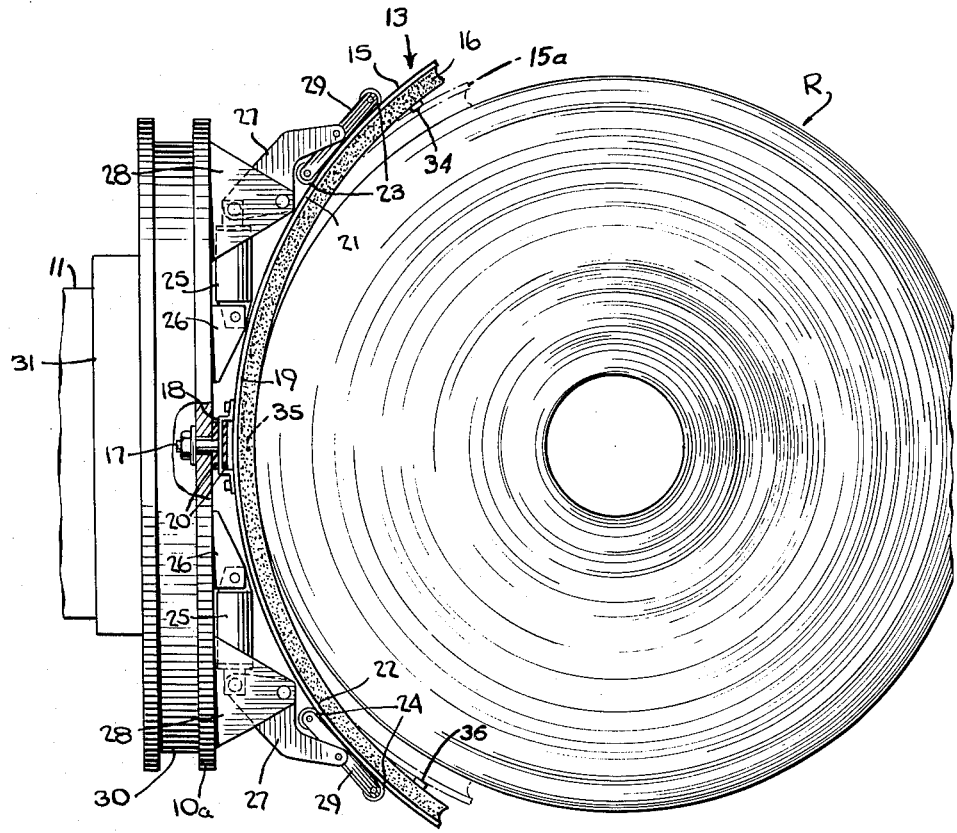
FIG. 3 shows a plan view.

In the construction that I prefer and that I show in FIGS. 1, 2 and 3, my novel vacuum device 10 has two load engaging members 13, 14 arranged one above the other, that utilize the vacuum for gripping the roll R. However, I may indicate here that my device 10 will be effective when constructed so as to have merely a single member that engages the load. Actually, the members 13, 14 are substantially alike, and the novel features of my invention will be understood if I describe merely the details of the load engaging member 13.

The load engaging member 13 comprises a curved metal plate 15 that is equipped with a lip 16 of rubber or similar material extending around the peripheral edge of the plate, so that plate 15 presents a cupped surface adapted for vacuum sealing contact with the surface of the roll R. I form the plate 15 with an initial curvature that will match the contour of the largest diameter roll that is to be handled, that roll being somewhat larger than the roll R shown in FIG. 3.

Referring again to FIG. 3, the plate 15 is supported on a base 10a through a bolt 17 and a bracket 18 attached to a medial portion 19 of the plate 15. Yielding inserts 20 at opposed sides of the bracket 18 allow the plate 15 to articulate sufficiently to change its alignment to a certain extent. It will be seen in FIG. 3 that the plate 15 is relatively wide, with side portions 21 and 22 extending a considerable distance in opposed directions from the medial plate portion 19.

Pairs of rollers 23, 24, also best shown in FIG. 3 are adapted to press against the rear surfaces of the plate side portions 21, 22. The pressure of each pair of rollers 23, 24 will be contributed by a hydraulic ram 25 that acts between a bracket 26 on the base 10a, and a bellcrank lever 27. Each bellcrank lever 27 is pivoted on a bracket 28 on base 10a, and is adapted to move an equalizing lever 29 that carries the corresponding pair of rollers 23 or 24. When hydraulic pressure is applied to the rams 25, the rollers 23, 24 will cause the side portions 21, 22 of plate 15 to move inwardly through flexing of the plate 15, so that plate 15 will assume a sharper curvature, as shown in phantom at 15a in FIG. 3. Thereby, the plate 15 will match the contour of the roll R, so that its sealing lip 16 may very easily establish a sealing contact with the surface of the roll R.

It will be noted that I contribute a load gripping vacuum device in which the vacuum gripping device is supported by a base member for adjacent, and is adjusted by means carried by the base member. In this way the vacuum device may easily establish a sealing contact with load surfaces of varying shapes, and may lift loads through this contact. The importance of my contribution will be appreciated when it is realized that the earlier devices of the particular kind generally depend upon yielding of a load engaging member to allow the member to establish sealing contact with a load. While my sealing devices do yield to make contact, they are rigid once they are engaged with the load. Also, through the novel concept of my invention, a load gripping vacuum device may be adjusted by power to match the shape of a load, so that the device need not collide forcibly with a load in order to establish a vacuum sealing contact, while once engaged with the load, there is a rigid effective coaction that facilitates lifting.

Thus far I have not described in detail the mounting of my gripping device 10, but that mounting may very well include a conventional load rotating device 30, FIG. 1, of which the base 10a is a part. As will be understood, the rotating device 30 will enable my gripping device 10, to upend a roll that is gripped. I equip the rotating device 30 with a bracket 31 that is adapted to pivot on an upper edge of the load carriage 11 of the truck T. A lower portion of the rotating device 30 rests against a pair of coil springs 32, one of which is seen in FIG. 1, that are engaged between washers 33 welded to device 30 and to carriage 11. Should the truck T so position the load engaging members 13, 14 that the lower member 14 is brought first against the roll R, the springs 32 may yield so that both upper and lower members 13, 14 may move equally into contact with the surface of the roll.

I now call attention to the fact that I equip the flexible plate 15 of my load gripping vacuum device with a series of sensing devices 34, 35, 36 that are shown in FIGS. 2 and 3. Each sensing device may be a normally open switch of a conventional sensitive type, and will be closed when brought against the surface of a load. It will be seen that the sensing device 35 is mounted on the medial plate portion 19, while the devices 34, 36 are mounted on the plate side portions 21, 22. FIG. 2 shows similar sensing devices 134, 135, 136 on the lower plate 14, but my invention will be understood if I refer merely to the devices 34, 35, 36 on plate 15.

Figure 4:
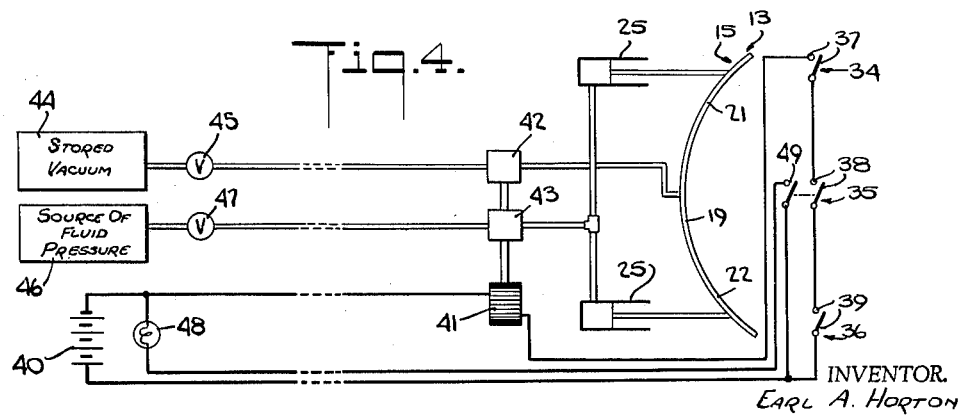
FIG. 4 shows vacuum and control circuits that I may utilize with my device.

FIG. 4 of the drawings shows the sensing devices 34, 35, 36 arranged in a circuit that may be utilized, those devices having corresponding pairs of contacts 37, 38, 39 connected in series with one another and with a battery 40 and a solenoid coil 41. The battery 40 may be mounted in a suitable location on the truck T, as will be appreciated, while coil 41 may be supported on the truck or on the gripping device 10. The solenoid coil 41 will operate two valves 42, 43, the arrangement being such that both valves will be actuated when all of the sensing devices 34, 35, 36 are actuated.

The valve 42 is of the normally closed type, and when actuated may cause vacuum to be applied from a reservoir 44 to the vacuum plate 15. There also will be a manually actuated valve 45 through which the operator of the truck may control the vacuum, but that control will only be effective when valve 42 is actuated to open position through the sensing devices 34, 35, 36.

The valve 43 is of the normally open type, allowing fluid pressure to be applied from a source 46 through a manual valve 47 to the two hydraulic rams 25 that control the curvature of the vacuum plate 15. When all of the sensing devices 34, 35, 36 are actuated, valve 43 will close so that rams 25 will hold the plate in a particular curvilinear shape.

As further shown in FIG. 4, I prefer to arrange an indicator light 48 in series with normally open contacts 49 that form a further part of the medial sensing device 35.

The operation of my novel gripping device 10 will be best understood if we first assume that the operator drives the truck T toward the roll R. We will assume also that the gripping device 10 is in an initial or unactuated position in which the flexible plate 15 has a curvature flatter than the surface of the roll R, as is shown in FIG. 3. Now, if the operator properly steers the truck, the medial portion 19 of the plate 15 naturally will be the first to be juxtaposed to the roll R. That causes the medial sensing device 35 to be actuated through contact with the surface of roll R, but the sensing devices 34, 36 will be away from the load, and therefore will not be actuated. However, the mere actuation of the sensing device 35 will energize the indicator light 48, shown in FIG. 4. Thereby the truck operator will know that he has placed the truck in the proper position relatively to the roll R.

The operator then will move the manual valve 47, FIG. 4, to apply fluid pressure to the rams 25, causing the plate 15 to flex so that its side portions 21, 22 and their sensing devices 34, 36 move toward the surface of roll R. As a preparatory step, the operator may also move the vacuum valve 45, but the vacuum will not yet be applied to the plate 15 since solenoid valve 42 still is closed. When the plate side portions 21, 22 have been moved into juxtaposed relation to the surface of roll R, the sensing devices 34, 36 will be actuated through contact with the roll, causing the coil 41 to close the solenoid valve 43, and automatically stopping the operation of the rams 25. The rams 25 now hold the plate 15 in a shape matching the contour of the roll R, as shown at 15a in FIG. 3, with the lip 16 substantially in contact with the roll. At the same time, coil 41 has opened solenoid valve 42, so that the vacuum may be applied to the load engaging member 13. It will be appreciated, of course, that valve 42 has prevented the application of the vacuum until the load engaging member 13 has assumed the proper shape and is substantially in vacuum sealing contact with the load surface. That naturally prevents an undue loss of vacuum through the member 13.

I have already indicated that the lower load engaging member 14 of my novel gripping device is like the upper member 13, and I therefore believe it will be unnecessary to describe the lower member in detail. I may indicate, however, that I prefer to connect the sensing devices 134, 135, 136 that are mounted on the lower member 14 in series with the sensing devices 34, 35, 36 on the upper member 13, so that the proper positioning of both of those members will be necessary to control the application of vacuum and fluid pressure to the members.

In a modification of my invention, I utilize a vacuum gripping construction having a plurality of vacuum members that are articulated relatively to one another. In FIG. 5 of the drawings, I show two pairs of articulated load gripping vacuum members 50, 51 and 52, 53. Each pair 50, 51 and 52, 53 is pivoted on the opposed ends of an equalizing lever 54, that lever in turn being pivoted to a bellcrank lever 55. Each bellcrank lever 55 is supported through a pivot 56 on a bracket 57, and is actuated by a hydraulic ram 58. Thus, the vacuum members 50, 51, 52 and 53 articulate and conform to the contour of a load.

I believe that the very considerable value of my invention will now be fully appreciated.

I now claim:

1. In a truck of the class described having a load carriage mounted for lifting movement, a load gripping vacuum device including a flexing plate, means directing vacuum toward said plate, a yielding lip extending around a face of said flexing plate and presenting surfaces for vacuum sealing contact with a load, support means engaged with a medial portion of the flexible plate to support said plate on the load carriage of the truck, power means acting against opposed side portions of the plate for flexing said plate so that the vacuum surface will assume different curvilinear shapes, sensing means mounted in position on the medial and each side portion of the plate to be actuated when the vacuum sealing surfaces are juxtaposed to the surface of a load, means through which the actuation of said sensing means controls the power means whereby to match the shape of the vacuum sealing surfaces to the contour of a cylindrical load, and further means through which the sensing means control the vacuum directed toward the plate to prevent a loss of vacuum before the sealing surfaces are substantially in matching shape and in position to make vacuum sealing contact with the load.

2. In a truck of the class described, a base member mounted on the truck, a load gripping vacuum device having surfaces on one side thereof adapted for vacuum sealing contact with a load, a first portion of said device mounted for movement with said base member whereby to engage the load as the truck moves bodily into a particular position relatively to the load, second portions of said vacuum device arranged at opposite ends of said first portion and adapted for movement relative to said first portion, said vacuum sealing surfaces extending on each of said first and second portions of the device, movable pressure members coacting with rear surfaces of the said second portions, supporting means for said movable pressure members on the base member, power means on said base member actuated for pressing the movable pressure members against the rear surfaces of the vacuum device for adjusting the shape of said device after said first portion of the device has engaged the load in said particular position of the truck, enabling said device more readily to engage the surface of a load, and said power means effective when actuated to hold the vacuum device rigidly in adjusted position on its support while engaged with the load.

3. In a truck of the class described having a load carriage mounted for lifting movement, a load gripping vacuum device including a flexible plate, means presenting surfaces extending around a face of said plate for vacuum sealing contact with a load, means engaged with a medial portion of said plate to mount said plate for movement with the load carriage, and supporting said medial portion in position to engage the load as the truck moves into a particular position relatively to the load, opposed side portions of said plate moving relatively to the medial plate portion and to one another when the plate flexes, and power means for flexing the plate whereby to place said load contacting surfaces in a curvilinear shape matching the contour of a cylindrical load after said medial portion of the plate has engaged the load in said particular position of the truck, so that said surfaces may easily establish vacuum sealing contact with the load.

4. In a truck of the class described having a load carriage mounted for lifting movement, a load gripping vacuum device, means for supporting said device on said load carriage, said device having load contacting surfaces that are adapted for vacuum sealing contact with a load, a first portion of said device secured to said supporting means for movement with the truck so as to contact the load as the truck moves bodily into a particular position relatively to the load, second portions of said vacuum device arranged at opposite ends of said first portion and adapted for movement relative to said first portion to change the relative positions between the load contacting surfaces of the said device, said load contacting surfaces extending on each of said first and second portions of the device, power means for actuating said second portions of the vacuum device to move said portions relative to said first portion, and means for controlling the power means to move the second portions of the device to positions matching the contour of a load after the first portion has moved into contact with the load in said particular position of the truck, so that said surfaces may easily establish sealing contact with load surfaces of varying shapes.

5. In a truck of the class described, a base member mounted on the truck, a load gripping vacuum device having surfaces adapted for vacuum sealing contact with the load and including a series of portions at least one of which is adapted to initially contact the load, other of said portions arranged at opposite ends of said one portion and being movable relative to said one portion, said load contacting surfaces extending on each of the portions of said series of portions, means supporting said device in position on said base member to effect contact between said one portion and the load as the truck moves bodily to a particular position relatively to the load, movable pressure members coacting with rear surfaces of said other portions for moving said portions toward the load, supporting means for said movable pressure members on the base member, and power means on said base member for moving the movable pressure members against said rear surfaces of the vacuum device for adjusting the shape of said device after said one portion of the device has moved into contact with the load in said particular position of the truck, so that said device may more readily move into contact with loads of varying shapes for gripping the load.

6. In a truck of the class described having a load carriage mounted for lifting movement, a load gripping vacuum device supported on said load carriage, said device presenting surfaces that are adapted for vacuum sealing contact with a load, a first portion of said vacuum device positioned to initially engage a load as the truck moves bodily into a particular position relatively to the load, second portions of said vacuum device arranged on opposite ends of said first portion and adapted for movement relatively to said first portion and into engagement with the load, said load contacting surfaces extending on each of said first and second portions of the device, power means for moving said second portions of the device whereby to change the relation between the load contacting surfaces presented by the device, and sensing means controlling said power means and actuated through juxtaposition of the load contacting surfaces to a load after said first portion of the device has engaged the load in said particular position of the truck, whereby to place said load contacting surfaces substantially in a shape matching the contour of the load surface.

References Cited by the Examiner

UNITED STATES PATENTS 1,505,626  8/1924  Debaecker _____ 294—65
1,792,576  2/1931  Dryon.

(Other references on following page)

UNITED STATES PATENTS

| | | | |
|---|---|---|---|
| 2,131,869 | 10/1938 | Burrell | 294—65 |
| 2,475,367 | 7/1949 | Avery | 214—653 |
| 2,578,220 | 12/1951 | Billner | 294—65 |
| 2,596,477 | 5/1952 | Frischmann et al. | 214—652 |
| 2,609,108 | 9/1952 | Peterson et al. | |
| 2,819,806 | 1/1958 | Vieth | 214—650 |
| 2,899,088 | 8/1959 | Corbin | 214—651 X |
| 2,941,675 | 6/1960 | Noble et al. | |
| 2,942,745 | 6/1960 | Horton | 214—650 |
| 3,089,723 | 5/1963 | Fortson et al. | 294—65 |
| 3,115,262 | 12/1963 | Avery | 214—650 X |
| 3,147,872 | 9/1964 | Olson. | |
| 3,166,202 | 1/1965 | Arnold | 294—65 X |

GERALD M. FORLENZA, *Primary Examiner.*

MORRIS TEMIN, HUGO O. SCHULZ, *Examiners.*

R. B. JOHNSON, *Assistant Examiner.*